Patented Sept. 19, 1944

2,358,444

UNITED STATES PATENT OFFICE 2,358,444

COPOLYMERS OF VINYLETHINYL CARBINOLS WITH ALPHA-METHYLENE MONOCARBOXYLIC ACID ESTERS

Donald Drake Coffman and Clarence England Denoon, Jr., Wilmington, Del., assignors to E. I. du Pont de Nemours & Company, Wilmington, Del., a corporation of Delaware No Drawing. Application April 10, 1942, Serial No. 438,510

7 Claims. (Cl. 260—84)

This invention relates to copolymers of vinylethinyl carbinols with acrylic type esters and the process of preparing the same.

Acrylic, including methacrylic, type ester polymers are of considerable technical utility. However, at least in certain applications, it is desirable to have products of higher softening point, plasticity and surface hardness.

This invention has as an object an acrylic type ester polymer of higher softening point. A further object is a more plastic acrylic type ester polymer. Another object is such a polymer having greater surface hardness. Other objects will appear hereinafter.

These objects are accomplished by the following invention wherein a (2-vinylethinyl) carbinol and an ester of an aliphatic alpha-methylene monocarboxylic acid are copolymerized in the presence of a polymerization catalyst in a multiple phase polymerization system comprising an aqueous phase and a second phase containing the carbinol and the acrylic type ester.

The copolymerization of a (2-vinylethinyl) carbinol with an acrylic type ester can be accomplished by several methods. One of the most useful consists of polymerization by a granulation technique. This polymerization is carried out in a system comprising a low proportion, e. g., 0.5–10%, preferably 0.5–2.5%, of (2-vinylethinyl) carbinol and the acrylic type ester, a catalyst such as benzoyl peroxide, a granulating agent such as the sodium salt of polymethacrylic acid, a buffering agent such as disodium hydrogen phosphate, and water. By the term granulating agent is meant a dispersing agent which in the proportions used produces a dispersion of the monomeric materials during vigorous agitation but does not give a stable emulsion without agitation. This method produces the polymer in small granules which are easily washed and handled. This mixture is agitated vigorously and refluxed for several hours until polymerization is essentially complete. It is then allowed to cool while continuing the agitation. The copolymer which separates in fine white granules upon stopping the agitation is filtered and washed. This copolymer is soluble in a large variety of organic solvents and can be molded to a clear vitreous chip having increased softening point, plasticity, and hardness when compared with the control polymer prepared in an analogous fashion from the acrylic type ester alone.

As an alternative method, it is convenient to copolymerize these products by an emulsion method. This type of polymerization is effected by the agitation of the vinylethinyl carbinol and the acrylic type ester in a system comprising a long chain dispersing agent, a catalyst such as, for example, ammonium persulfate, and water. This system disperses the monomeric materials into the form of an emulsion and then the polymerization is effected by heating and agitating at 40–60° C. On some occasions the copolymer coagulates, as formed during polymerization, while in other cases it is necessary to add a coagulating substance such as aluminum sulfate. The coagulated copolymer can be filtered, washed, screened, and further washed to yield a white powdery product which is soluble in a large variety of organic solvents and which can be molded to clear vitreous chips.

The more detailed practice of the invention is illustrated by the following examples, wherein parts given are by weight. There are of course many forms of the invention other than these specific embodiments.

Example I

In a reaction chamber fitted with a stirrer, an instrument for indicating temperature, and a reflux condenser are placed 0.2 part of dimethyl (2-vinylethinyl) carbinol, 39.8 parts of methyl methacrylate, 8 parts of a 1% aqueous solution of the sodium salt of polymethacrylic acid, 0.8 part of benzoyl peroxide, 0.8 part of $Na_2HPO_4.12H_2O$ and 72 parts of water. The mixture is subjected to vigorous stirring and refluxed for 2.25 hours and then allowed to cool with continued stirring. Filtration and drying gives a 92% yield of a white, granular, methyl methacrylate/dimethyl (2-vinylethinyl) carbinol copolymer which is soluble in ordinary organic solvents, such as benzene, acetone, dioxane, chloroform, and ethyl acetate, and can be molded to clear glasslike chips.

A series of copolymers is prepared in this fashion containing varying proportions of dimethyl (2-vinylethinyl) carbinol in methyl methacrylate. The following data illustrate the properties of these copolymers:

| Percent dimethyl (2-vinylethinyl) carbinol in monomer mixtures | Softening point, °C. | Hardness, Rockwell H scale at 26° | Plasticity, Bell method at 155° C.[3] |
|---|---|---|---|
| 0 | 89 | 60 | 15 |
| 0.5 | 96.5 | [1] 68 | 19 |
| 1.25 | 99 | [1] 65 | 22.3 |
| 2.5 | 100 | 76 | 30.3 |
| 5 | 98 | 74–9 | 40 |
| 10 [2] | 98 | | 40 |

[1] These values obtained at 29° C.
[2] This experiment differed in that it had a reaction time of 10 hours.
[3] A. S. T. M. Preprint No. 108, 1940.

The above data illustrate that the copolymerization of small amounts of dimethyl (2-vinylethinyl) carbinol with methyl methacrylate produces marked advantages in elevation of the softening point, increase in surface hardness, and increase in plasticity, which is quite important in improving the flow of plastic materials in the mold during the molding operation.

Example II

To a mixture of 7.8 parts of a dispersing agent which contains as its active ingredient 22% of sodium hexadecylsulfate, 0.6 part of ammonium persulfate, and 108 parts of water and which has been adjusted to a pH of 7.1 by addition of aqueous sodium hydroxide are added 3 parts of dimethyl (2-vinylthinyl) carbinol and 57 parts of methyl methacrylate. This mixture is placed in a reaction chamber, the chamber flushed with oxygen-free nitrogen, closed, and heated with agitation at 60° C. for 40 hours. The methyl methacrylate dimethyl (2-vinylethinyl) carbinol copolymer is obtained in the form of a latex which is coagulated by the addition of 10% aluminum sulfate solution. The copolymer is then filtered, washed, and dried to give an 83% yield of a white, powdery copolymer which is soluble in a variety of organic solvents such as acetone, benzene, dioxane, chloroform, and ethyl acetate and can be molded to transparent chips. Portions of this polymer which are to be used for molding are ground, screened, and washed thoroughly to remove the last traces of dispersing agent. Using this method a series of methyl methacrylate copolymers is prepared from monomer mixtures containing from 2 to 15% dimethyl (2-vinylethinyl) carbinol. Their properties are illustrated by the data in the table below.

| Percent dimethyl (2-vinylethinyl) carbinol in monomer mixtures | Softening point, °C. | Hardness, Rockwell H scale at 32° C. |
|---|---|---|
| 2 | 102 | 76 |
| 5 | 97 | 69 |
| 10 | 92 | 65 |
| 15 | 88 | |

Copolymers quite similar to those prepared by the granulation technique are thus obtained. Analysis of the copolymer obtained from the monomer mixture containing 10% carbinol indicates that the copolymer also contains approximately 10% carbinol.

Using the emulsion technique of polymerization and the isolation technique as described in Example II, polymers are prepared by polymerizing mixtures of 25% dimethyl (2-vinylethinyl) carbinol in methyl methacrylate, 50% dimethyl (2-vinylethinyl) carbinol in methyl methacrylate, and 100% dimethyl (2-vinylethinyl) carbinol. These copolymers which have softening points of 81° C., 58° C., and 71° C., respectively, are not soluble in ordinary organic solvents, and are useful in certain applications, e. g., in alcohol-resistant molded articles.

Although this invention has been illustrated by the copolymerization of methyl methacrylate and dimethyl (2-vinylethinyl) carbinol, a large variety of acrylic type esters and (2-vinylethinyl) carbinol is suitable. Any (2-vinylethinyl) carbinol, i. e., any aliphatic alcohol having on the carbinol carbon a vinylethinyl $CH_2=CH—C\equiv C—$ group, the remaining valences of the carbinol carbon preferably being satisfied with hydrogen or preferably hydrocarbon radicals may be employed, including methylethyl, methylpropyl, methyl-tert.-butyl, cyclohexyl, and p-methyl cyclohexyl (2-vinylethinyl) carbinols and the (2-vinylethinyl) carbinols disclosed in Carothers and Jacobson U. S. Patent 1,963,934; Carothers, Berchet and Jacobson U. S. Patent 1,963,074, and Carothers, Berchet and Jacobson U. S. Patent 1,963,935. Carbinols derived from substituted monovinylacetylenes are also appropriate; for example 1,1,4-trimethyl-1-hydroxy-4-ene-2-pentine, $CH_2=C(CH_3)—C\equiv C—C(—CH_3)_2OH$.

A particularly preferred carbinol, dimethyl (2-vinylethinyl) carbinol may be prepared by the method of U. S. Patent 1,963,934, U. S. Patent 1,963,935, and U. S. Patent 1,963,074 or more conveniently as follows:

A mixture of 102 parts of monovinylacetylene, 29 parts of acetone, 28 parts of finely powdered potassium hydroxide is placed in a previously cooled container, closed, and agitated overnight. The reaction product is poured into ice, extracted with a solvent such as benzene, and then distilled under diminished pressure. Forty-four parts (80%, based on the acetone) of very pure dimethyl (2-vinylethinyl) carbinol is obtained, B. P. 70.5° C./27 mm.; refractive index, $n_{25}{}^D$, 1.4740. This use of excessive monovinylacetylene eliminates the necessity for ether as a solvent which is relatively undesirable in commercial practice. When monovinylacetylene and acetone are reacted in 1:1 molar ratios, the elimination of ether as a solvent gives a marked increase in yield. The above method of preparation is applicable to the synthesis of a wide variety of (2-vinylethinyl) carbinols.

In the process of this invention any ester of an alphamethylene monocarboxylic acid may be employed i. e., of any monocarboxylic acid having a methylene ($CH_2$) radical united by an ethylenic double bond to the carbon alpha to the carboxyl carbon. While the methyl methacrylate of the examples is the preferred ester, the invention includes within its scope the acrylic and methacrylic esters of alkanols, e. g., methanol, ethanol, butanol and higher alkanols, of nitroalcohols, aminoalcohols and cyanoalcohols, e. g., 2-methyl-2-nitropropanol, N-diethylaminoethanol, and 2-cyanoethanol and the acrylates and methacrylates of unsaturated alcohols such as, for example, furyl acrylate and methacrylate, methallyl acrylate and methacrylate, and acrylyl acrylate and methacrylate.

Esters of alpha substituted acrylic acids other than methacrylic acid may be employed, e. g., methyl alpha-chloroacrylate, ethyl alpha-bromoacrylate, and methyl alpha-butylacrylate.

Although the proportions of the acrylic type ester and the (2-vinylethinyl) carbinol in these copolymers can be varied within wide limits, depending on the use for which the copolymer is intended, it is desirable to use certain preferred proportions. When the polymers are to be used for molding compositions, the desired increase in softening point and hardness is obtained with relatively small amounts of (2-vinylethinyl) carbinol, e. g., 0.5–5%. Where clarity is of great importance proportions of 1% and less of dimethyl (2-vinylethinyl) carbinol are appropriate. Definite effects in raising the softening point are obtained with 0.5% of the carbinol in the monomer mixture. If a polymer of high plasticity is desired it is advisable to use more than 10% of dimethyl (2-vinylethinyl) carbinol. Polymers containing 0.5–15% of dimethyl (2-vinylethinyl) carbinol are soluble in a variety of organic solvents such as acetone, benzene, dioxane, chloroform, and ethyl acetate, and are suitable for use in coating compositions which display drying properties when small amounts of a catalyst such as cobalt naphthenate are present. As the proportion of dimethyl (2-vinylethinyl) carbinol is increased, e. g., to 25% or more, the products tend to become more insoluble, which is desirable for certain applications. By the term "insoluble" it is meant that a major portion of the polymer does not dissolve in a solvent, although it is possible that a minor fraction of the polymer does dissolve. In general, it was found that polymers prepared by the granulation technique tend to be more soluble than those prepared by the emulsion method.

These copolymers are prepared most conveniently by two methods, the granulation or the emulsion technique, both of which are techniques which involve a multiple phase system. The granulation technique, which is the preferred method, and is illustrated in Example I, consists of rapidly stirring and heating the polymerization materials in a system comprising water, a buffering agent, a catalyst, and a granulating agent such as the sodium salt of polymethacrylic acid. It is characteristic of this system that very vigorous agitation is necessary, and the resultant polymer does not ordinarily take the form of an emulsion but rather is formed into small granules the major portion of which settle out when the agitation is stopped. This fact is of considerable importance in that the isolation of the copolymer is accomplished more easily, and the copolymer is easier to filter and wash. Although the sodium salt of polymethacrylic acid is disclosed in Example I, many other granulating agents, e. g. a partially hydrolyzed polyvinyl acetate methyl starch, pectin and agar-agar, are suitable. In place of the sodium hydrogen phosphate used to control the pH of the solution, a wide variety of buffering agents such as citrates, acetates, and other phosphates are suitable. It is convenient to utilize in this invention a large number of organic peroxides such as benzoyl peroxide, lauroyl peroxide, succinyl peroxide, and ascaridole. Also suitable are inorganic peroxides such as hydrogen peroxide. The amount of catalyst will, in general, have an effect on the properties of the copolymer such as molecular weight and will be chosen with this and the desired speed of reaction in mind. In general, increased amounts of catalyst increase the rate of polymerization and lead to polymers of lower molecular weight. The amount of catalyst is therefore chosen so as to get the desired molecular weight in a convenient time. Although the amount of catalyst such as benzoyl peroxide can be varied from 0.1 to 5%, concentrations in the range of 1 to 2% are preferable.

These copolymerizations can be carried out in a considerable variety of reaction chambers, the nature of which is not a part of this invention. It is, however, most important that adequate agitation be maintained in order to disperse the monomeric materials in the form of relatively small granules. Although it is most convenient to carry out these polymerizations at reflux temperature, lower reaction temperatures which necessitate longer reaction times or higher reaction temperatures which involve the use of pressure equipment are quite feasible and in some instances desirable.

In the emulsion process, illustrated in Example II, the polymerizable monomers are dispersed or emulsified in a system containing a catalyst, a dispersant, and water, and are then polymerized by heating and agitating. Depending upon the composition of the copolymer and the polymerization conditions, the copolymer is obtained either in the form of a latex or a coagulum. If the latex is produced, it is coagulated by means of aluminum sulfate, filtered, and washed thoroughly to remove the dispersing agent. If the copolymer is to be used for molding purposes, it is generally desirable to grind the copolymer, screen, and thoroughly wash to remove the last traces of the dispersant. In certain uses in which these copolymers are utilized in the form of an emulsion, this method of polymerization is preferred. However, in general, the isolation and purification of the copolymers is more readily effected when they are made by the granulation technique.

In the practice of this invention, many commercially available dispersing agents may be employed. Among these are the alkali metal salts of fatty acids, long chain alkali metal sulfonates and sulfates such as sodium oleate, sodium pentadecanol-8-sulfate, and sodium tri-isopropylnaphthalenesulfonate. Also suitable are long chain quaternary ammonium salts and betaines such as octadecyltrimethylammonium bromide and hydroxy-propyl-C-cetylbetaine.

Particularly useful are the acid stable dispersing agents which are acyclic hydrocarbons of 12–18 carbon atoms substituted with only one nitrogen-free, anionic, solubilizing group such as long chain alkali metal sulfonates and sulfates. These are acid stable in the sense that their activity is unaffected in media of mild acidity, e. g. pH 3–5. Although ammonium persulfate is the preferred catalyst, other persulfates such as potassium persulfate and sodium persulfate, peroxides such as benzoyl peroxide, hydrogen peroxide, succinyl peroxide, and various per salts such as perborates are suitable.

Although the emulsion copolymerizations can be carried out using temperatures from room temperature up to 90° C., it is generally more convenient to use temperatures in the range of 40–65° C.

Because of the hydroxyl groups and the unsaturated linkages in the copolymers, they may be further modified. Thus films which are cast from solutions of the copolymers can be baked to hard, insoluble films in the presence of cobalt driers. The copolymers can be mixed with sulfur and other vulcanizing ingredients and cured by heating. These reactants are ascribed to the presence of unsaturated linkages in the copolymer. Because of the hydroxyls in the copolymers they may be reacted with carboxylic acids, aldehydes, ketones, organic isocyanates and isothiocyanates, ketenes, ketenimides and carbodiimides.

The copolymers of this invention are useful in the production of molded products. They can be molded by compression or injection into objects such as combs, dentures, lenses, jewelry, electrical equipment, automobile accessories, and drafting equipment. The soluble polymers are useful in the formulation of coating compositions having the ability to form hard, insoluble films in the presence of metallic driers.

These copolymers can be admixed with other materials, for example, other organic substances such as drying oils, plasticizers, and resins, and fillers such as wood flour, chalk, clay, and carbon black. The copolymers are useful as binders and adhesives for abrasives, wood, paper, and a considerable variety of cellulosic and fibrous materials.

The above description and examples are intended to be illustrative only. Any modification of or variation therefrom which conforms to the spirit of the invention is intended to be included within the scope of the claims.

What is claimed is:

1. A copolymer of an ester of an alpha methylene monocarboxylic acid with 0.5 to 10%, by weight thereof, of a (2-vinylethinyl) carbinol.

2. A copolymer of methyl methacrylate with 0.5 to 10%, by weight thereof, of a (2-vinylethinyl) carbinol.

3. A copolymer of methyl methacrylate with 0.5 to 10%, by weight thereof, of dimethyl (2-vinylethinyl) carbinol.

4. Process which comprises polymerizing a mixture of methyl methacrylate with 0.5 to 10%, by weight thereof, of dimethyl (2-vinylethinyl) carbinol.

5. Process which comprises polymerizing a mixture of an ester of an alpha methylene monocarboxylic acid with 0.5 to 10%, by weight thereof, of a (2-vinylethinyl) carbinol.

6. Process which comprises agitating and heating a multiple phase, aqueous system containing an ester of an alpha methylene monocarboxylic acid, a polymerization catalyst and 0.5 to 10%, by weight of said ester, of a (2-vinylethinyl) carbinol.

7. Process which comprises vigorously agitating and heating a multiple phase, aqueous system containing an ester of an alpha methylene monocarboxylic acid, 0.5 to 10%, by weight of said ester, of a (2-vinylethinyl) carbinol, a buffering agent, a polymerization catalyst and a granulating agent.

DONALD DRAKE COFFMAN.
CLARENCE ENGLAND DENOON, Jr.